US011564851B2

(12) United States Patent
Harris

(10) Patent No.: US 11,564,851 B2
(45) Date of Patent: Jan. 31, 2023

(54) MULTI-FUNCTIONAL EVACUATION BLANKET

(71) Applicant: Paul Harris, Rocheport, MO (US)

(72) Inventor: Paul Harris, Rocheport, MO (US)

(*) Notice: Subject to any disclaimer, the term of this patent is extended or adjusted under 35 U.S.C. 154(b) by 263 days.

(21) Appl. No.: 17/086,411

(22) Filed: Nov. 1, 2020

(65) Prior Publication Data
US 2021/0128371 A1 May 6, 2021

Related U.S. Application Data

(60) Provisional application No. 62/929,832, filed on Nov. 2, 2019.

(51) Int. Cl.
B32B 27/32 (2006.01)
A61G 1/01 (2006.01)
B32B 27/06 (2006.01)
B32B 7/04 (2019.01)
B32B 3/08 (2006.01)

(52) U.S. Cl.
CPC ............... *A61G 1/01* (2013.01); *B32B 3/085* (2013.01); *B32B 7/04* (2013.01); *B32B 27/06* (2013.01); *B32B 27/32* (2013.01); *B32B 2307/582* (2013.01); *B32B 2307/75* (2013.01)

(58) Field of Classification Search
CPC ............... A61G 1/01; B32B 2307/75; B32B 2307/582; B32B 27/32; B32B 27/06; B32B 7/04; B32B 3/085
See application file for complete search history.

(56) References Cited

U.S. PATENT DOCUMENTS

| 1,365,169 | A  | 1/1921  | Goldberg         |
| 1,438,475 | A  | 12/1922 | Bisbing          |
| 2,105,787 | A  | 1/1938  | Herpich          |
| 4,495,233 | A  | 1/1985  | Bassetti         |
| 5,189,746 | A  | 3/1993  | Horie            |
| 5,443,880 | A  | 8/1995  | Wike             |
| 5,737,785 | A  | 4/1998  | Casey            |
| 6,199,232 | B1 | 3/2001  | Kocivar          |
| 6,202,235 | B1 | 3/2001  | Salhanick        |
| 6,489,000 | B1 | 12/2002 | Ogura et al.     |
| 6,541,096 | B1 | 4/2003  | Richards et al.  |
| 6,594,836 | B1 | 7/2003  | Everson et al.   |
| 6,721,973 | B1 | 4/2004  | Cristiano        |
| 6,854,139 | B2 | 2/2005  | Lamy             |
| 7,621,006 | B1 | 11/2009 | Tucker           |
| 7,636,965 | B1 | 12/2009 | Tucker           |
| 7,739,761 | B1 | 6/2010  | Tucker           |
| 7,766,950 | B2 | 8/2010  | Castellani et al.|
| D624,773  | S  | 10/2010 | Bizzell          |
| 7,945,977 | B1 | 5/2011  | Tucker           |
| 2007/0151029 | A1 | 7/2007 | Bridges          |

(Continued)

FOREIGN PATENT DOCUMENTS

GB 2198348 A 6/1988

*Primary Examiner* — Ellen S Hock
(74) *Attorney, Agent, or Firm* — The Law Firm of Brett M. Maland

(57) ABSTRACT

Disclosed herein is a device and method for evacuating patients during medical emergencies. The device is an evacuation blanket comprised of a cover and a carrier. The cover includes a number of inventive elements supporting an improved method of evacuating patients and matching those patients to the blanket used for their evacuation after the patient has been evacuated to a destination and separated from the blanket.

17 Claims, 4 Drawing Sheets

(56) References Cited

U.S. PATENT DOCUMENTS

| | | |
|---|---|---|
| 2008/0021520 A1 | 1/2008 | Castellania et al. |
| 2009/0113629 A1 | 5/2009 | Tucker |
| 2010/0011506 A1 | 1/2010 | Jensen et al. |
| 2010/0122423 A1 | 5/2010 | McNair |
| 2010/0138996 A1 | 6/2010 | Davis |
| 2011/0302717 A1 | 12/2011 | Campasano |
| 2012/0073048 A1 | 3/2012 | Ballard |
| 2013/0276235 A1 | 10/2013 | Kenalty et al. |
| 2014/0059765 A1 | 3/2014 | Harris |

MULTI-FUNCTIONAL EVACUATION BLANKET

CROSS REFERENCE TO RELATED APPLICATION

This application claims priority to U.S. Provisional Pat. App. No. 62/929,832 filed Nov. 2, 2019 and titled Multi-Functional Evacuation Blanket.

FIELD

This document relates to devices and methods for human patient transport.

BACKGROUND

Transporting patients in emergency situations poses a difficult challenge for responders, and no current tools exist for effective transport in ranging situations. Patient transport issues during emergency operations and daily transfers show planning and response deficits, including; 1) providing continuity of care for increased customer satisfaction by ensuring that the patient chart/information/medicines and other items follow the patient; 2) transferring biological material in patient linens during transfers from one facility to another facility, leading to nosocomial and iatrogenic infections; 3) protecting against linen loss by maintaining the proper inventory of linens, which are often lost during transfers causing increased costs to the hospital; and 4) transporting patients in emergency situations and evacuations. The disclosed invention meets these needs and fulfills many regulatory agency requirements.

SUMMARY

The current invention is a multifunctional blanket intended for transporting patients. While the invention can be applied to multiple patient situations, one specific application is for transporting patients by air medical or other emergency services. The multifunctional evacuation blanket fits in a carrier to become an evacuation blanket. Such carriers are generally strong blankets reinforced with heavyweight polypropylene webbed straps, wherein the straps also extend beyond the edges of the strong blanket to act has handles. The multifunctional evacuation blanket would also function as a blanket for a stretcher.

In one aspect, an evacuation blanket is provided for evacuating patients. The evacuation blanket includes an absorbent layer and a top layer, the top layer further including two or more pockets wherein at least one pocket is a transparent pocket. The evacuation blanket further includes a tear away band configured to be detached from the evacuation blanket by a pull from a human responder's hand pull, such as by a perforated connection. The wrist band has an identification component corresponding to the evacuation blanket and is configured to attach to a patient. An ideal identification element is a wrist band, but the invention is intended to include an ankle band or any other item for attaching to a human patient. The evacuation blanket also includes one or more flaps configured to cover one or more of the one or more pockets. The flaps can be closed over the pockets with a plurality of coupling points that attach to the pocket or evacuation blanket. These coupling points are preferably hook and loop commonly known as Velcro.

In another aspect, the evacuation blanket includes a slit located substantially in the center of the evacuation blanket.

In another aspect, the evacuation blanket is substantially rectangular, with the flaps being parallel to the longer side of the substantially rectangular evacuation blanket.

In another aspect, the plurality of blanket coupling points are configured to attach to a plurality of carrier coupling points via a hook and loop mechanism.

In another aspect, the flap coupling points couple to the blanket coupling points by hook and loop coupling.

In another aspect, the evacuation blanket further includes at least two transparent pockets and at least two non-transparent pockets.

In another aspect, the evacuation blanket further includes a carrier with an absorbable pad, wherein one side of the evacuation blanket is permanently fixed or attached to a corresponding side of the carrier, such as by having the two sewn together. Alternatively, the blanket and carrier may be one continuous sheet. On the side of the evacuation blanket opposing the side that is permanently attached, there are a plurality of carrier coupling points that are configured to attach and detach from the plurality of blanket coupling points. These coupling points are structured and configured to attach and detach easily, such as with a hook and loop connection. The carrier includes reinforcing straps to provide strength to support the weight of a human patient, such as when that patient is transferred from a stretcher to a hospital bed.

In another aspect, the top of the evacuation blanket is made of a material capable of being written on with pencil and pen, such as polypropylene.

In another aspect, the tear away connector is located inside a transparent pocket.

In another aspect, the tear away band corresponds to evacuation blanket with a corresponding bar code. This does not necessarily need to be the same bar code, but the identification means on the wrist band must correspond to the identification means that remains on the evacuation blanket.

In another aspect, the evacuation blanket is comprised of a waterproof material and has a plurality of pockets, at least some of which are configured to close, wherein at least one of the pockets is transparent, and wherein the evacuation blanket has an identification element that is configured to be attached to a patient and is further configured to be associated with the evacuation blanket so that a patient can recover any belongings that may have been placed in any of the pockets after the patient is separated from the evacuation blanket.

In another aspect of the invention, a method of a responder or responders evacuating a patient using the evacuation blanket is provided. The various steps can be performed in various orders.

The method includes a responder removing belongings that may complicate the performance of emergency medicine, such as jewelry, and placing those belongings in one of a plurality of pockets on the evacuation blanket. Most preferably, personal belongings would go in opaque pockets.

The method also includes the step of a responder will detach an identification component from the evacuation blanket and fix it to the patient, such as by attaching a wrist band or ankle band. When the patient is ultimately delivered to a destination, such as a hospital providing certain care not available at a first location, the patient is typically delivered to a bed and separated from the evacuation blanket. This makes it important to later match the blanket to the patient.

The method also includes the step of placing the patient onto the carrier portion of the evacuation blanket while the top layer has been peeled away or pulled away such that the patient is not on top of the blanket. This allows for the top layer to be pulled away from the side where the top layer is attached to the carrier and over the patient. The top layer is then connected to the carrier on the side that is opposite to the side where the carrier portion is permanently sewn or fixed to the top layer. The patient now is somewhat sealed on each side and sandwiched between the top layer and carrier. In the preferred embodiment, the patient contacts absorbable pads that are integrated with the top layer and carrier with one beneath the top layer and one above the carrier.

The method may also include the step of performing some medical care during transportation, such as triage. Medical information associated with this medical care can be inserted into the transparent pocket. This will allow medical responders at the patient's destination to easily see the medical information associated with the patient.

BRIEF DESCRIPTION OF FIGURES

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Figure 1:
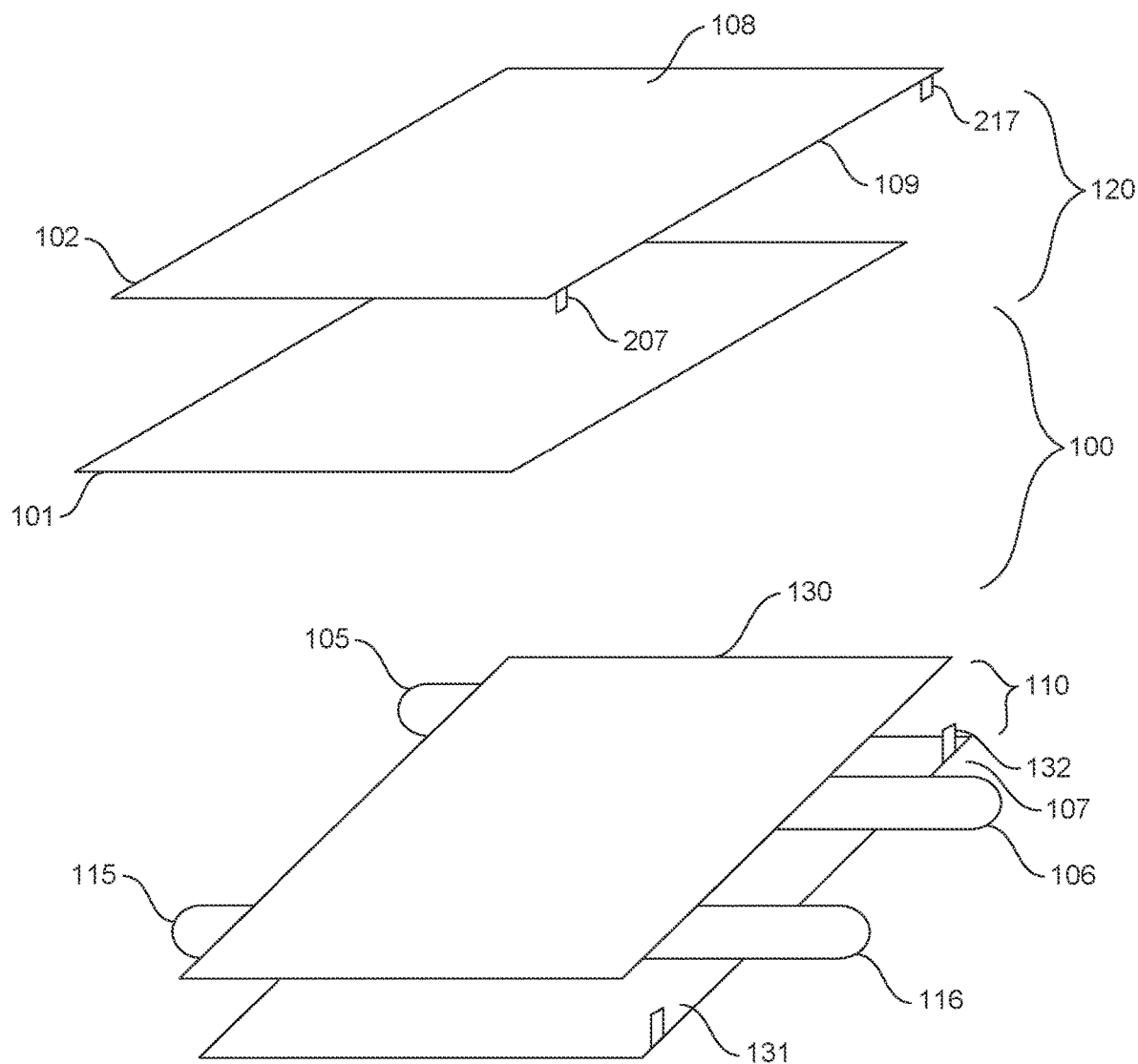
FIG. 1 illustrates the layers of the evacuation blanket.

The description that follows describes, illustrates and exemplifies one or more particular embodiments of the present invention in accordance with its principles. This description is not provided to limit the invention to the embodiment or embodiments described herein, but rather to explain and teach the principles of the invention in such a way as to enable one of ordinary skill in the art to understand these principles and, with that understanding, be able to apply them to practice not only the embodiment or embodiments described herein, but also other embodiments that may come to mind in accordance with these principles.

The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing reference numbers, such as, for example, in cases where such labeling facilitates a more clear description. Unless otherwise stated, the invention is not to be limited to the number of certain elements shown (the invention may contain more than four handles, for example). Additionally, the drawings set forth herein are not necessarily drawn to scale, and in some instances proportions may have been exaggerated to more clearly depict certain features. Such labeling and drawing practices do not necessarily implicate an underlying substantive purpose.

Furthermore, certain views are side views which depict only one side of the device (or one set of components of a multi set array of components), but it will be understood that the opposite side and other component sets are preferably identical thereto. The present specification is intended to be taken as a whole and interpreted in accordance with the principles of the present invention as taught herein and understood by one of ordinary skill in the art.

Referring to FIG. 1, the preferred embodiment of the invention is an evacuation blanket 100 comprising a blanket 120 and a carrier 110. The blanket is comprised of a top layer 102 and an absorbent layer 101. The top layer 102, with or without the absorbent layer 101, functions as a blanket and the carrier 110 enables the invention to be an evacuation blanket. The top layer 102 has a first side 109 and a second side 108. The absorbent layer 101 contacts the first side 109 of the top layer. The absorbent layer 101 is preferably a surgical pad that is sewed onto the first side of the top layer. The preferred method for connecting the absorbent layer 101 to the top layer 102 is stitching or sewing in a manner similar to quilting connection wherein more than the perimeter is fused.

In the preferred embodiment, the carrier 110 is comprised of a carrier layer 107 and a carrier absorbent layer 130. The carrier layer includes a plurality of reinforcing straps 106, 116, 105, 115 that are integral to the carrier 110 and in the preferred embodiment, are sewn together with the carrier layer 107 or the carrier 110. The reinforcing straps 106, 116, 105, 115 provide reinforcement to hold the weight of human patients. The straps 106, 116, 105, 115 extend beyond the carrier 110 to act as handles. The straps 106, 116, 105, 115 are configured so there are at least four handles (two on each side). There can be more straps 106, 116, 105, 115 than shown in FIG. 1 to create more reinforcing or more handles. In the preferred embodiment, the straps 106, 116, 105, 115 are heavyweight polypropylene webbed straps.

In one embodiment, the blanket 120 has a plurality of coupling elements 207, 217 that can couple and decouple to a plurality of coupling elements 131, 132 on the carrier 110.

In another embodiment, the top layer 102 is independent and does not have a carrier 110. The top layer 102 exists with or without an absorbent layer 101. In this embodiment, the slit 209 shown in FIG. 2 can be used to provide a space for a patient's head so that the top layer acts as a poncho.

Figure 2:
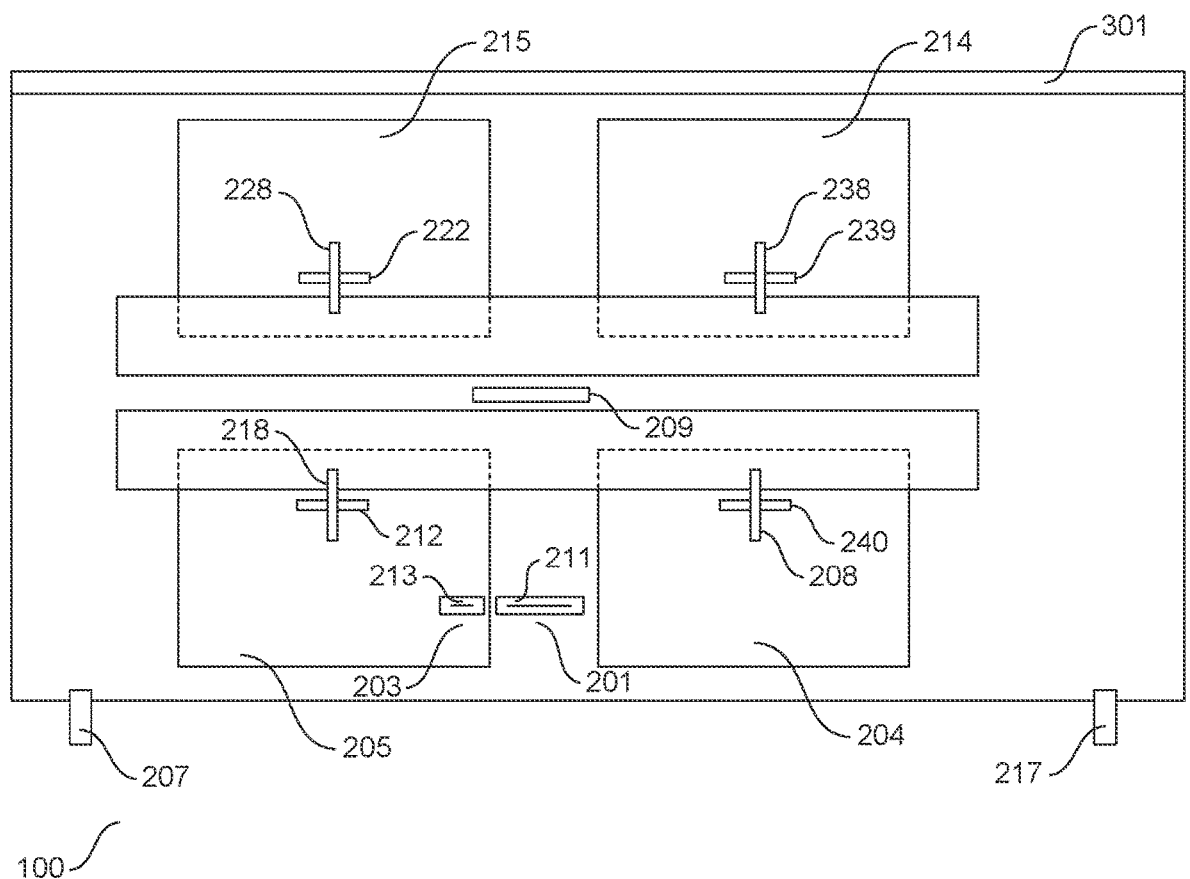
FIG. 2 illustrates the elements on the top or surface of the evacuation blanket.

Referring to FIG. 2, the second side 108 of the top layer 102 has a plurality of pockets 204, 205, 214, 215. In the preferred embodiment, there are four pockets. The most preferred embodiment includes at least one pocket that is a transparent pocket 205. Inside the at least one transparent pocket 205 is a tear away band 201 loosely coupled to a tear away connector 203 firmly and fixedly attached to the evacuation blanket. The tear away band 201 has an identification component 211 that matches an identification component 213 on the tear away connector 203. In the most preferred embodiment, the identification component 213 remains fixed to the evacuation blanket 100 and a patient identification component 211 attaches to the patient and the two identification components correspond to one another. In the preferred embodiment, both identification components 211, 213 are of a form that can be electronically scanned, such as a bar code or codes that can be read by mobile devices such as smartphones. Corresponding the patient to the evacuation blanket 100 via the identification components 213 and 211 can also be done manually with numbers, letters or some other means known in the art. The tear away connector is permanently coupled to the second side 108 of the top layer 102 such as by sewing or stitching the tear away connector 203 to the second side 108. The tear away band 201 is detachably coupled to the tear away connector 203. In the preferred embodiment, the tear away band 201 is detachably coupled to the tear away connection 203 by means of a perforated connection.

The second side 108 of the top layer 102 also has one or more flaps 206, 216 for covering the plurality of pockets 204, 205, 214, 215. The flaps having a plurality of flap coupling points 208, 218, 228, 238 that couple to blanket coupling points 212, 222, 239, 240.

The blanket 120 is coupled to the carrier 110 on one side 301, such as by sewing the two together. The blanket 120 and carrier 110 can be one continuous sheet with reinforcing straps beneath the carrier 110. In some embodiments, such as when the top layer 102 is separate for its independent utility, the top layer 102 can be configured to be coupled to a carrier 107. In that configuration, the top layer 102 has a plurality of system coupling points 207, 217 configured to couple and decouple to a plurality of carrier coupling points 131, 132 (shown on FIG. 1). The system coupling points are designed to couple the top layer to a carrier, such as a strong carrier blanket or a stretcher.

In the most preferred embodiment, the evacuation blanket has a slit 209 that allows the evacuation blanket to be converted to a poncho by allowing a patient to put his or her head through the slit.

The evacuation blanket 100 is substantially rectangular, with the flaps being parallel to the longer side of the substantially rectangular evacuation blanket. Typical dimensions are about six to seven feet in length and three to four feet wide. The evacuation blanket 120 is attached to the carrier 110 at seam 301. Instead of a seam 301, the blanket and carrier can be a continuous sheet.

The plurality of system coupling points are comprised of the hook portion of a hook and loop coupling mechanism, and the plurality of system coupling points are on the longer side of the substantially rectangular evacuation blanket. The flap coupling points couple to the blanket coupling points by hook and loop coupling or other means known in the art. Alternatively, the blanket could hang over the patient on one side and stretcher straps can be used to secure the patient between the absorbable pads 101, 130.

Figure 3:
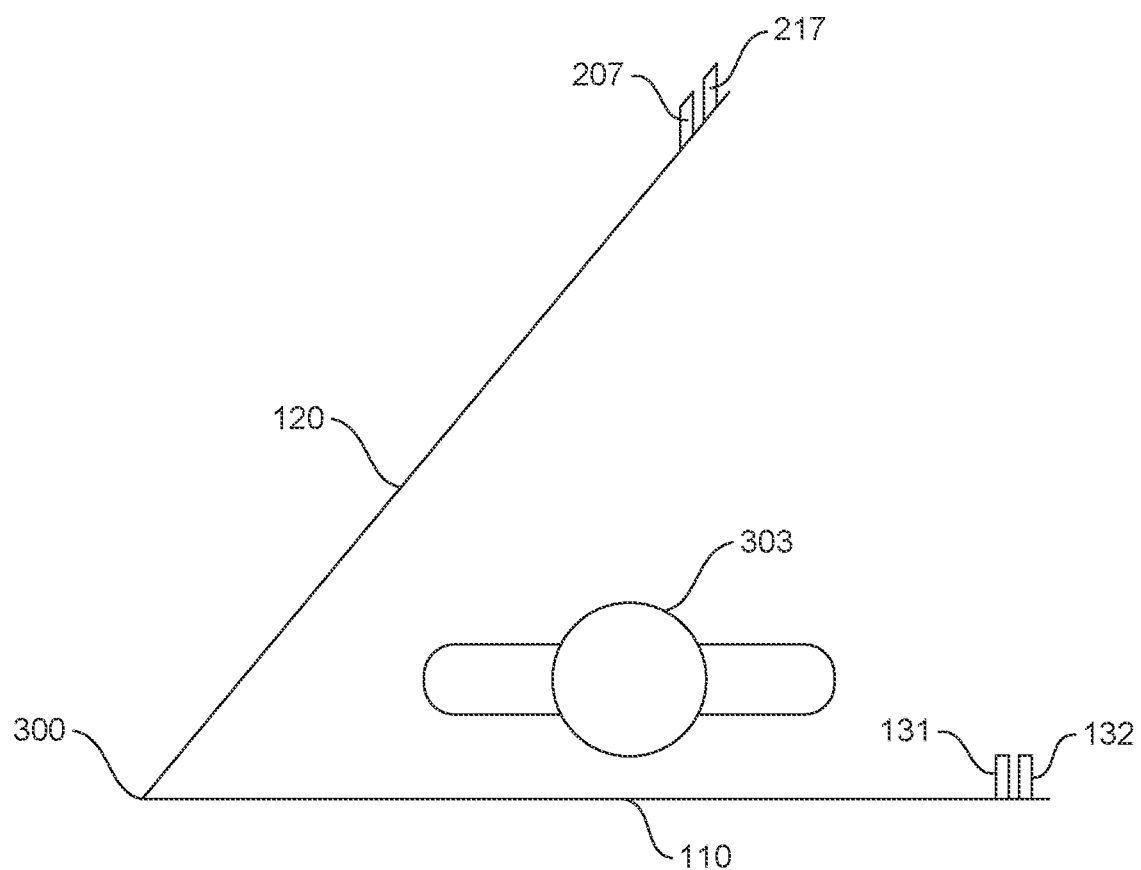
FIG. 3 illustrates how the evacuation blanket is operated with a patient.
Figure 4:
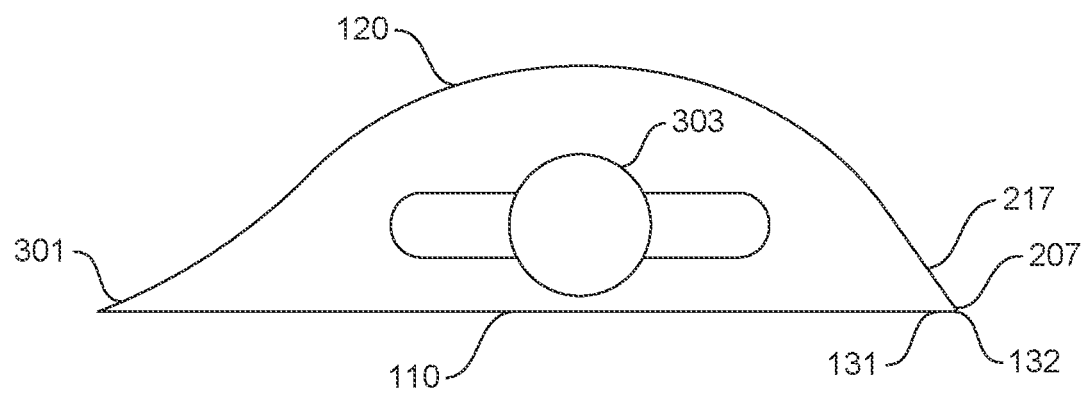
FIG. 4 illustrates how the evacuation blanket encloses a patient.

FIG. 3 and FIG. 4 illustrate the method of using the evacuation blanket. A patient 303 is placed on top of the carrier 110 with the blanket 120 pulled away from the carrier 110 as shown in FIG. 3. Next, the blanket 110 can be pulled over the patient 303 as illustrated in FIG. 4. In one embodiment, the blanket 120 is secured to the carrier 110 on the side opposing the connected side 301 using coupling points 207, 217, 131, 132. In other embodiments, the blanket 120 can just be pulled over the patient without securing the blanket 120 to the carrier on the side opposing the connected side 301. Stretcher straps (not shown) can be used to secure the blanket 120 around the patient 110.

In the most preferred embodiment, the evacuation blanket has at least two transparent pockets and at least two non-transparent pockets.

In the preferred embodiment, the top layer 102 is a material with a number of important characteristics. It can be written on with pen or pencil and is typically a breathable, water resistant material for transportation in inclement weather, such as a thin polypropylene material. The flaps and any non-transparent or opaque pockets are typically of the same material.

I claim:

1. An evacuation blanket comprising
an adsorbent layer and
a top layer, the top layer further comprising a first side and a second side, wherein
the adsorbent layer contacts the first side and the second side includes a plurality of pockets
wherein at least one pocket is a transparent pocket
a tear away band loosely coupled to a tear away connector, the tear away band having an identification component corresponding to an identification component on the tear away connector, the tear away connector being permanently coupled to the evacuation blanket,
one or more flaps attached to the second side configured to cover one or more of the plurality of pockets, the flaps having a plurality of flap coupling points configured to couple to the second side.

2. The evacuation blanket of claim 1 further comprising a slit located substantially in the center of the evacuation blanket.

3. The evacuation blanket of claim 1, wherein the evacuation blanket is substantially rectangular, with the flaps being parallel to the longer side of the substantially rectangular evacuation blanket.

4. The evacuation blanket of claim 3, wherein the blanket has a plurality of blanket coupling points configured to attach to a plurality of carrier coupling points via a hook and loop coupling mechanism.

5. The evacuation blanket of claim 1, wherein the flap coupling points couple to the blanket coupling points by hook and loop coupling.

6. The evacuation blanket of claim 1, further comprising at least two transparent pockets and at least two non-transparent pockets.

7. The evacuation blanket of claim 1, further comprising a carrier with an absorbable pad, wherein one side of the blanket is attached to a corresponding side of the carrier.

8. The evacuation blanket of claim 1, wherein the top layer is made of a material capable of being written on with pencil or pen.

9. The evacuation blank of claim 1, wherein the tear away connector is located inside a transparent pocket.

10. The evacuation blanket of claim 7, wherein the carrier is comprised of carrier coupling points and is reinforced with straps that are integral to the carrier.

11. The evacuation blanket of claim 7, wherein the blanket is sewn to the carrier for permanent attachment.

12. The evacuation blanket of claim 1, wherein the tear away band corresponds to the tear away connector with a corresponding bar code.

13. An evacuation blanket comprised of a waterproof material and having a:
a plurality of pockets
at least one flap for covering at least one pocket
a tear away band corresponding to a tear away connector.

14. The evacuation blanket of claim 13, the tear away connector being located inside one of the at least one pockets.

15. The evacuation blanket of claim 13, the tear away connector being located inside the at least one transparent pocket.

16. The evacuation blanket of claim 13, further comprising a slit in the middle of the evacuation blanket.

17. The evacuation blanket of claim 13, further comprising a plurality of at least two opposing sides of the evacuation blanket configured to couple to a carrier.

* * * * *